US006720922B2

(12) United States Patent
Williams et al.

(10) Patent No.: US 6,720,922 B2
(45) Date of Patent: Apr. 13, 2004

(54) RADIO-FREQUENCY BADGE FOR LOCATION MEASUREMENT

(75) Inventors: Lyndsay Williams, Cambridge (GB); Roger M. Needham, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 49 days.

(21) Appl. No.: 10/112,217

(22) Filed: Mar. 29, 2002

(65) Prior Publication Data

US 2003/0184475 A1 Oct. 2, 2003

(51) Int. Cl.$^7$ ................................................. G01S 3/02
(52) U.S. Cl. ........................ 342/465; 342/463; 342/464
(58) Field of Search ................................. 342/463, 465, 342/457, 464; 455/456.1, 456.3, 457

(56) References Cited

U.S. PATENT DOCUMENTS

| 5,365,516 A | * 11/1994 | Jandrell ........................ 370/18 |
| 5,621,417 A | * 4/1997 | Hassan et al. ............... 342/457 |
| 5,748,103 A | * 5/1998 | Flach et al. ............. 340/870.07 |
| 5,920,261 A | * 7/1999 | Hughes et al. ............... 340/572 |
| 6,459,989 B1 | * 10/2002 | Kirkpatrick et al. ........ 701/215 |
| 6,542,114 B1 | * 4/2003 | Eagleson et al. ...... 342/357.07 |

OTHER PUBLICATIONS

Bokun, I. And K. Zielinski. Active Badges—The Next Generation. Olivetti–Oracle Research Laboratory, Cambridge, UK.
Demers, A. Research Issues in Ubiquitous Computing. Xerox Palo Alto Research Center. 1994 ACM 0–89791–654–9/94/0008.
Djuknic, G.M. and R. E. Richton. Geolocation and Assisted GPS. In Computer Innovative Technology for Computer Professions. Feb. 2001, vol. 34, No. 2.
Hightower, J. and G. Borriello. Location Systems for Ubiquitous. In Computer Innovative Technology for Computer Professionals. Aug. 2001, vol. 34, No. 8.
Hopper, A., A. Harter, and T. Blackie. The Active Badge System. Interchi '93. ACM 0–89791–575–5/93/0004/0533.
Want, R. and B. Schilit. Expanding the Horizons of LocationAware Computing. In IEEE, 2001.
Want, R., A. Haopper, V. Falcao and J. Gibbons. The active badge location sysstem. ACM Transactions on Informations Systems, Jan. 1992, 91–102.
U.S. patent application Ser. No. 09/018,897, Christ, filed Feb. 5, 1998.
U.S. patent application Ser. No. 10/096,187, Dempsey, filed Mar. 11, 2002.
U.S. patent application Ser. No. 09/173,437, Mazer, filed Dec. 23, 1993.

* cited by examiner

*Primary Examiner*—Dao Phan
(74) *Attorney, Agent, or Firm*—Lyon & Harr, LLP; Richard T. Lyon

(57) ABSTRACT

A system and process for determining the location of persons and objects using transmitters (TXs) that transmit location messages to at least one receiver connected to a computer, in a network of computers. The TXs are small, battery-powered, radio frequency transmitters carried by the person or object whose location is being tracked. The location message signals are picked up by one or more receivers (RXs) scattered throughout an environment. Each TX transmits a code with a unique identifier, and each RX also has a unique identifier. The RXs measure the signal strength of each location message transmission. Each RX is connected to a computer, which is in turn connected to a network. The RX computers send the data messages including the TX identifier, radio signal strength, and RX identifier to a central computer via the network. The central computer uses this information to determine the location of the TXs.

39 Claims, 4 Drawing Sheets

RADIO-FREQUENCY BADGE FOR LOCATION MEASUREMENT

BACKGROUND

1. Technical Field

The invention is related to location tracking systems, and more particularly to a system and process for determining the location of persons and objects carrying radio frequency (RF) transmitters that transmit data messages to at least one RF receiver connected to a computer in a computer network. The receivers forward data received from the transmitters to the network, along with radio signal strength indicator (RSSI) data, for computation of the location of the person or object carrying each transmitter.

2. Background Art

Knowledge of the location of people and objects is essential to the viability of many current mobile and ubiquitous computing schemes. For example, in a mobile computing environment, a user of a mobile computing device (e.g., notebook computer, handheld PC, palm-size PC, Personal Digital Assistant (PDA) or mobile phone) may wish the device to provide directions to a particular location in a building, such as the nearest printer, snack room, restroom, etc., or perhaps directions to a particular conference room or office within the building. This type of information is dependent on knowing the current location of the user. Mobile computing device users also typically expect messages and other notification information to be provided to them wherever they happen to be. However, some notifications can be dependent upon the user's location. For instance, a user might be notified that he or she is near a printer where a user-submitted document has been printed. Again the user's current location is needed to make such a notification. A mobile computing device user might also want to know the location of other people in the building, in order to find them or obtain information about them. For example, a user might want to get a list of the names of people attending the same meeting. To obtain this information, it is necessary to know what people are at the location of the meeting. The foregoing are just a few examples of the need to know the location of people. It is easy to imagine many other situations where knowledge of the location of people would be useful to a mobile computing device user.

Location information is equally critical in so-called ubiquitous computing. Ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large environment), through whatever set of devices is available, be they fixed or carried by the user.

It is noted that the term computer is used loosely here in that the user actually would have access to a wide variety of computing and information services, which will likely employ many computers and "smart" devices such as the aforementioned PDA's, mobile phones, etc. For example, computing services such as web browsing, document editing, or video conferencing are envisioned. Thus, it should be understood that when the term computer is used in connection with the concept of ubiquitous computing, in actuality many computers may be involved non-exclusively in a single interactive session.

The usefulness of an ubiquitous computing system hinges on the ability to maintain an awareness of the users, particularly their locations. One goal of such a system would then be to understand the physical and functional relationship between the users and various I/O devices. This knowledge could be employed to allow a user to move from room to room while still maintaining an interactive session with the computer. In addition, knowledge about who and what is in the vicinity of a person can be used to tailor a person's environment or computing session to behave in a context-sensitive manner. For example, knowing the location of a person in a building can be used to infer what activity that person is engaged in and then the environment or computing session can be adjusted appropriately.

There are several current technologies for automatically determining the location of people and objects. For example, one of the first of such location systems uses diffuse infrared technology to determine the location of people and objects in an indoor environment. A small infrared emitting badge (sometimes referred to as a button or tag) is worn by each person, or attached to each object, whose location is to be tracked. The badge automatically emits an infrared signal containing a unique identifier every 10 seconds, or upon request of a central server. These requests are transmitted to the badges via a series of fixed infrared sensors placed throughout the indoor environment—typically mounted to the ceiling. The sensors also receive the infrared emissions from badges within their line-of-sight. The central server, which is hardwired to each sensor, collects the data received by the sensors from the badges and provides it to a location program for processing. These types of systems do not provide the actual 3D location of the person or object carrying the badge. Rather, the person's or object's location is deemed to be within the room or area containing the infrared sensor that received the emission from the badge attached to the person or object. In addition, these systems, being infrared-based, are susceptible to interference from spurious infrared emissions from such sources as fluorescent lighting or direct sunlight. Further, diffuse infrared-based systems have a limited range, typically only several meters. Thus, except in small rooms, multiple sensors are required to cover the area. In addition, since the sensors must be within the line-of-sight of the badges, a sensor must be placed in every space within a room that cannot be seen from other parts of the room. As a result, a considerable number of sensors have to be installed and hardwired to the central server. This infrastructure can be quite expensive and in some cases cost prohibitive.

Other existing indoor location systems attempt to improve the accuracy of the location process using a combination of radio frequency and ultrasonic emission. In these systems, a central controller sends a request for location data via a short range radio transmission to each badge worn by the people, or attached to the objects, whose location is being tracked. In response, the badges emit an ultrasonic pulse to a grid of fixed receivers, which are typically mounted to the ceiling. Each receiver that "hears" the ultrasonic pulse emitted from a badge reports its distance from the badge to the central controller via hardwired connections. Specifically, a synchronized reset signal is sent to each receiver at the same time the location request is transmitted to the badges. This reset signal starts a timing procedure that measures the time between the reset signal and the receipt of a ultrasonic pulse for a badge within range of the receiver. The receiver then computes its distance from the badge emitting the pulse and reports this to the central controller. An ultrasound time-of-flight lateration technique is then used by the controller to accurately determine the locations of the badges. While these types of systems do provide very accurate location information, they again require an expensive infrastructure in form of multiple receivers mounted throughout the environment which must be hardwired to the central controller. In addition, the accuracy of these systems has been found to be adversely affected if the placement of the receivers is less than optimal. Further, there is a concern associated with animals being sensitive to ultrasonic emissions.

A variation of the combined radio frequency and ultrasonic location system requires the badges to determine their own location, presumably to compute directions, and the like, and to provide the information to a person carrying the badge. In this case there is no centralized controller that determines locations of all the badges. Specifically, ultrasonic emitters are mounted in various locations around an indoor space. The badges include a radio frequency transceiver. Whenever location information is desired, the badge transmits a radio frequency signal. The emitters pick up the signal from the badges and respond with an ultrasonic pulse. The badge unit measures the time it takes to receive each ultrasonic pulse emitted by an emitter within range of the badge. In addition to the ultrasonic pulse, the emitters also transmit a radio frequency signal that identifies the emitter and its location. From the timing and emitter location information, the badge triangulates its own position. The infrastructure is not as problematic in this latter system since there can be fewer emitters and they are not hardwired into any kind of centralized controller. However, only the badge unit knows its location. Thus, there is no centralized database to provide location information to help locate persons in the building. In addition, the badges are relatively complex in that they must include both a radio frequency transceiver and an ultrasonic receiver, as well as the processing capability (and so power burden) to compute their location.

In yet another indoor location system, radio frequency LAN wirelesss networking technology is used to determine the position of people, or more specifically a computing device employing the wireless LAN technology (such as a notebook computer). In this system, base stations are deployed within the indoor environment to measure the signal strength and signal to noise ratio of signals transmitted by the wireless LAN devices. A centralized program takes the signal information from the base stations and employs a lateration process to estimate the location of the transmitting unit. This system has the advantages of requiring only a few base stations and using the same infrastructure that provides the building's general purpose wireless networking. However, person or object being tracked must have a device capable of supporting a wireless LAN, which may be impractical on small or power constrained devices.

Other current systems also employ radio frequency technology to locate people and objects in an indoor environment. One such system uses a centralized base station and a series of antennas spread throughout the environment that each emit a RF request signal which is received by badges within range of the antenna. These badges, which are attached to people and objects whose location is being tracked, transmit a RF signal in reply with an identifying code embedded therein. The location of the badge relative each antenna is computed using a measurement of the time it takes for the base station to receive the reply via the various antennas after the request is transmitted. However, the antennas have a narrow cone of influence, which can make ubiquitous deployment prohibitively expensive.

Electromagnetic sensing is also employed for position tracking. These types of systems generate axial DC magnetic field pulses from a fixed antenna.

The system then computes the position of the receiving antennas by measuring the response in three orthogonal axes to the transmitted field pulse. However, the infrastructure needed for these systems is expensive and the tracked object must be tethered to a control unit.

Finally, position tracking has been accomplished using computer vision techniques. In these systems, cameras are employed to determine where persons or objects of interest are located in an indoor environment. While these types of position tracking systems can be quite accurate, the processing required to analyze each camera frame is substantial, especially when complex scenes are involved. Thus, the infrastructure costs for these systems can be very high.

SUMMARY

The present invention is directed toward a system and process for determining the location of persons and objects in an environment that overcomes the limitations of existing location systems by utilizing existing infrastructure to minimize overhead costs and by employing a compact, simple radio frequency (RF) transmitter as a badge.

The system includes a plurality of battery-powered, radio frequency (RF), transmitters (TXs) that are carried by the person or object being tracked. One, or typically more, RF receivers (RXs) are used to receive location messages transmitted by TXs within signal range of the RX. Each RX is connected to a computer, which receives data messages from the RX generated using a location message received from a TX. A centralized computer is in communication with each of the computers associated with a RX via a conventional network. The centralized computing device tracks the location of each person or object carrying a TX, using data derived from data messages forwarded to it from the RX-connected computers.

The location messages transmitted by each TX include at least a transmitter identifier which uniquely identifies the particular TX transmitting the location message. Each RX receiving the location message from a TX measures the strength of the signal carrying the message to produce a radio signal strength indicator (RSSI). The RX then generates a data message that is forwarded to the centralized computer. This data message includes the transmitter identifier from the location message, the RSSI associated with the location message and a receiver identifier that uniquely identifies the particular RX sending the data message. The centralized computing device is preprogrammed to know the person or object associated with each TX and the physical location of each RX, thereby allowing the centralized computer to determine the location of each person or object carrying a TX using the RSSI, transmitter identifier and receiver identifier provided in a data message.

The location messages transmitted by the TXs can also include error detection data, preferably in the form of a message count and conventional checksum value. The message count is simply a number which is incremented each time a TX transmits a location message. The error detection data can be used in different ways. For example, the RX can determine whether a location message received from a TX has a message count increment one unit above the last, previously received, location message transmitted from that TX. If the message count is too high, then it is deemed that an interim location message was lost and the RX foregoes providing a data message corresponding to the out-of-sequence location message to the computer network. The same policy can be followed if the RX finds a received location message is incomplete or corrupted should the checksum not match the data received. Alternately, the RX can include the message count and checksum values received from a TX in the data message it forwards to the centralized computer. The centralized computer then decides whether or not to use the other data in the data message for locating purposes.

The battery-powered TX of the foregoing location tracking system has unique conservation features for extending the life of the battery. In general, the TX is constructed using a microcontroller, an accelerometer which is connected to the microcontroller and which provides a signal indicative of the severity of motion to which the TX is being subjected, one or more manually-operated function selection switches which are connected to the microcontroller and which activate and deactivate particular functions of the TX, a RF transmitter unit which is also connected to the microcontroller and which transmits the location message supplied to it by the microcontroller, and finally a power supply that includes a battery for powering the electronic components of the TX. The power saving features essentially involve using the accelerometer signal to curtail transmission of location messages during periods when there is no movement of the TX about an environment, such as an office building. By foregoing the transmission of location messages when the person or object has not moved, the power required to send the transmission is saved. This task can be accomplished by counting the number of times the accelerometer signal exceeds an accelerometer signal level threshold in a prescribed period of time (e.g., 1 second). If the count does not exceed a prescribed number (e.g., 2), the location message is not transmitted. If, however, the count does exceed the prescribed number a transmission is initiated. The accelerometer threshold represents a signal level over which it is likely the person or object carrying the TX is actually moving about the environment.

Further power can be saved by powering down the TX if no substantial movement has occurred for a period of time. Specifically, whenever the transmission of the location message is not made owing to a lack of movement, the microcontroller of the TX waits a prescribed timeout period (e.g., 2 seconds) and then counts the number of times the accelerometer signal exceeds the accelerometer signal level threshold in the aforementioned prescribed period of time. It is then determined if the count exceeds the aforementioned prescribed number. If the count does not exceed the prescribed number, it is next determined if a prescribed shutdown time limit (e.g., 1 minute) has been passed since the last transmission of a location message by the TX. Whenever it is determined that the shutdown time limit has not been exceeded, the process of waiting and sampling the accelerometer signal is repeated. If at any time during this process it is discovered the count exceeds the prescribed number, then the transmission of a location message is initiated. If, on the other hand, the count is not found to exceed the prescribed number during any iteration up to the time the shutdown time limit is exceeded, the TX is powered down to extend the life of the battery.

The TX stays in the foregoing powered down condition until one of the following occurs. First, preferably the aforementioned manually-operated function selection switches includes a "power on" switch. If a user activates this switch, the TX is powered up, regardless of whether it was in the power saving shutdown mode or not. In addition, the TX can be equipped with a motion-activated tilt switch. This switch remains open when the TX is at rest, but when the TX is moved it closes. If the TX is in the powered down condition when the tilt switch closes, a signal is sent to the microcontroller that caused the TX to be powered back up. Thus, if a powered down TX is moved, it reactivates. Finally, the microcontroller can be programmed to "wake up" periodically during the shutdown mode (e.g., once every hour) and to initiate the transmission of a location message. This last feature is useful in finding lost badges.

The manually-operated function selection switches can also optionally include a continuous transmission mode switch. This switch when activated causes a location message to be transmitted at prescribed intervals (e.g., every 1 second). This continuous transmitting mode of operation would override the power saving features and would remain in force until a user manually deactivates the switch. Another switch that can be included in a send-once switch, which when activated causes the microcontroller to transmit a location message regardless of when the location message would have been transmitted had the send-once switch not been activated. This is a one-time event, however, and the power saving mode of operation would be reestablished once the transmission is complete.

It is noted that the accelerometer data can also be included in the location message. This data can be used by the centralized computer to perform motion studies and the like. Specifically, an accelerometer signal history in the form of a count of the number of times the accelerometer signal exceeded the accelerometer signal level threshold in the aforementioned prescribed period of time is included in the location message. Preferably, a separate count is included for each consecutive prescribed period of time occurring since the last transmission of a location message.

Another useful feature that can be incorporated into the TX in the present location tracking system is a personal identification number (PIN) scheme. In this scheme, a user enters a PIN into an input apparatus, such as a number keypad on the TX. The number is then stored by the microcontroller. Whenever a location message is transmitted by the TX, the microcontroller includes the PIN in the message. The PIN is used by the location tracking system to identify the person or object carrying the TX. However, there is an issue of what to do about an activated TX with a stored PIN number that somehow becomes separated from the person or object with which it is associated. This can be handled using the accelerometer signal. In one version, the microcontroller monitors the accelerometer signal to determine if the TX is moving through the environment, and whenever it is determined that the TX has not moved for a period of time, the PIN is erased and no location message is transmitted until a replacement PIN number is entered into the TX. In another version, the accelerometer signal is made up of separate x-axis and y-axis signals. The microcontroller monitors the accelerometer signal to determine if the TX has been placed in an orientation other than an expected orientation, and whenever it is determined that the TX has been place in an unexpected orientation for a prescribed period of time, the PIN is erased and no location message is transmitted until replacement PIN number is entered.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
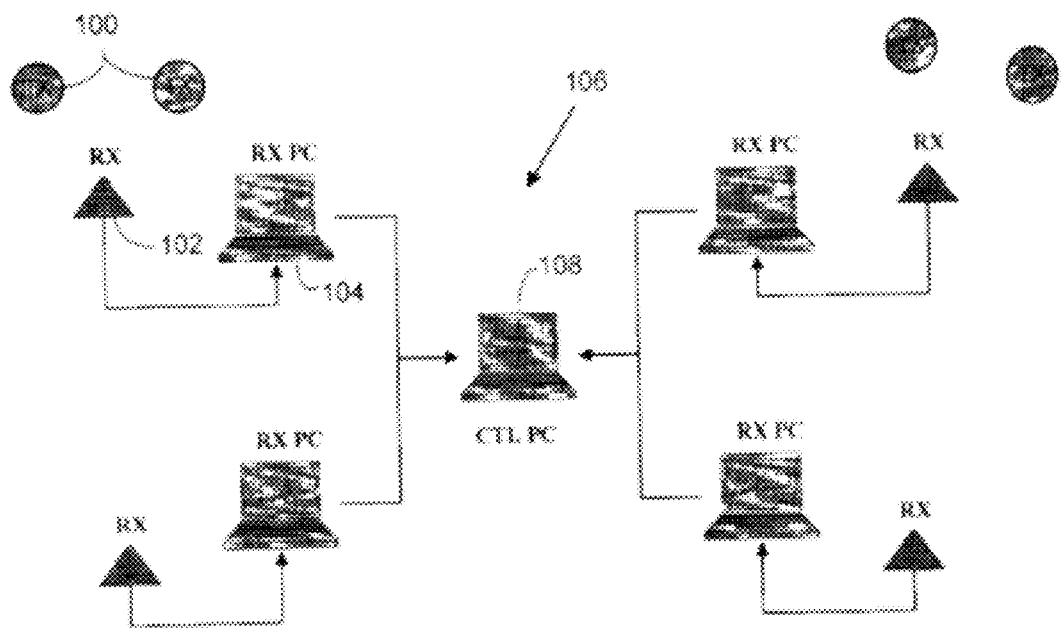
FIG. 1 is a diagram depicting a location tracking system according to the present invention.

Referring to FIG. 1, the location tracking system according to the present invention determines the location of persons and objects carrying radio frequency (RF) transmitters 100 that transmit messages to at least one RF receiver 102. Each receiver 102 is connected to a computing device 104, such as a personal computer (PC) that is in turn part of an existing network 106 of such computing devices. The receivers 102 forward data received from the transmitters 100, along with radio signal strength indicator (RSSI) data, to a centralized computer 108 via the network 106. The centralized computer computes the location of persons and objects associated with each transmitter based on the forwarded data and RSSI, using conventional methods. The location tracking system can be used in any environment, indoors or out. For instance, the receivers could be placed in every office in a building to determine which office a person or object is closest to.

One of the major advantages of the foregoing location tracking system is that it employs an existing computer network, thereby avoiding the considerable infrastructure cost associated with many of the previously described location systems. In addition, unlike existing systems, the transmitters used in the present location system are compact, simple RF transmitters only. There is no need for the transmitters to receive timing signals or any other data from the rest of the system to operate.

Figure 2:
FIG. 2 is an image depicting the exterior of one version of the RF transmitter, or badge, employed in the location tracking system of FIG. 1.

Specifically, in one version of the transmitter shown in FIG. 2, the transmitter (TX), or badge as it is often called, is a small palm-sized unit resembling an automobile key fob with buttons used to remotely control the door/trunk locks and car alarm. In this case, the buttons are respectively used to turn the TX on and off, transmit a message, and engage a continuous transmit mode. However, the TX can take on other forms, particularly ones that are much thinner and smaller than the depicted prototype. For example, other prototypes no bigger than a large coin have been constructed. It is also envisioned that TXs having the size and thickness of a credit card are possible. This latter version could be carried in a wallet or worn like a security badge. It is further envisioned that the TX could be configured to fit inside articles commonly carried with a person, such as a pen.

Figure 3:
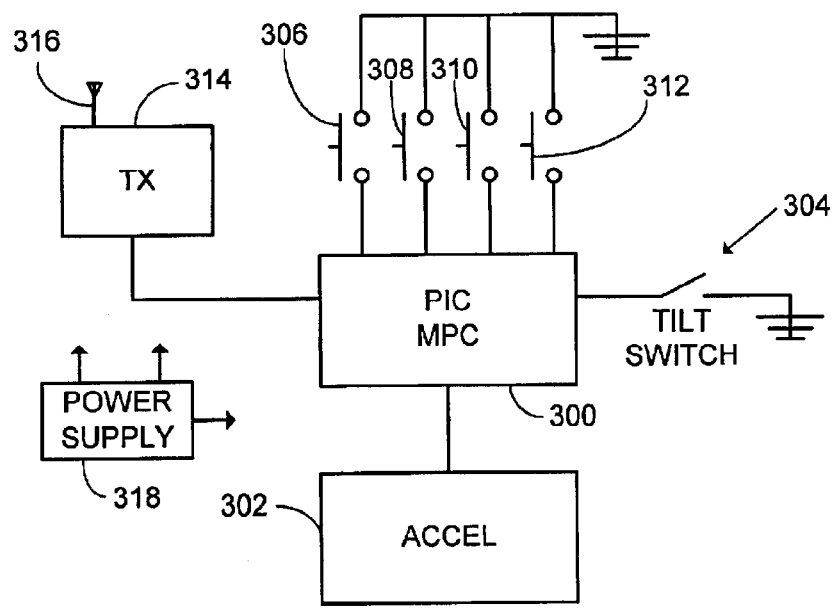
FIG. 3 is a block diagram illustrating the internal components included in the RF transmitter employed in the location tracking system of FIG. 1.

Referring now to the block diagram of FIG. 3, the general construction of the TX will be described. The heart of the TX is a PIC microcontroller 300 (e.g., a PIC 16C620 8 bit micro, FLASH ROM 512 Bytes, 128 byte RAM, 1 uA standby@3 v, 15 uA @32 Khz flush-mount Flash PIC microcontroller), which is connected to several other components. For example, the signal output of an accelerometer 302 is connected to the microcontroller 300. In the prototype TXs, the accelerometer 302 produced separate x-axis and y-axis signals that were combined to form the signal output sent to the microcontroller 300. The accelerometer's output signal can be used for a variety of purposes as will be described later. In versions of the TX where battery power is conserved by shutting down the unit if no appreciable movement is detected (i.e., the TX is operating in a "battery saving" mode that will be described in detail later), a tilt switch 304 is connected to the microcontroller. The tilt switch 304 closes and an interrupt signal to the microcontroller to "wake" it up, whenever the TX is moved after having gone into its shut down mode. There are also one or more manually-operated switches connected to the microcontroller 300. In the prototype TXs, four switches where included, although more or fewer switches could be used depending on what functions it is desired to make available for manual activation or deactivation. In the prototype TXs, push-button switches were used, however any type of switch could be employed. The first two of the switches 306, 312, are "power-on" and "power-off" switches, respectively. Whenever the power-on switch 306 is activated, the TX is powered up and begins operations. Conversely, when the power-off switch 312 is activated, the TX is off regardless of the position of the tilt switch 304. Thus, this switch 312 acts as a hard shutdown and is unaffected by movement of the TX. This hard shutdown mode not only saves battery life when the TX is not needed for providing location information, but affords a degree of privacy to a person carrying the TX since he or she can shut the unit off when they do not want their location known. The power-on and power-off switches are mutually exclusive in that whenever on is activated, the other is deactivated. The third switch 308 is a "continuous transmission mode" switch. This switch 308 is also normally off, and when it is off, the TX acts in the aforementioned "battery saving" mode.

However, when the continuous transmission mode switch is activated, the TX transmits a location message at prescribed intervals (e.g., every 1 second), regardless of whether the accelerator signal indicates the TX is moving or not. While battery life is not conserved in this mode, it is useful for motion studies and the like where the accelerometer data is transmitted along with the identity and other data components of a location message transmitted by the TX. The fourth switch 310 is a "send-once" switch. This switch is normally off, but in one version when activated initiates the transmission of a location message from the TX, regardless of the when the next transmission was scheduled (assuming the power-off switch is engaged). In other versions of the prototype TXs, the fourth switch 310 puts the TX into the aforementioned power saving mode where transmission is predicated on movement.

A radio frequency transmitter 314 with a small antenna 316 extending therefrom, is also connected to and controlled by the microcontroller 300. In the prototype TXs, a 433

MHz FM 14400 KBaud low power transmitter was employed. While any similar transmitter could be used instead, it is important to note that the optimal transmitter will be limited to a range of approximately 50 feet. This limited range helps prevent location message collisions as it is envisioned there will usually be only a few TXs within range of a RX at any given time. The 14400 KBaud transmission rate of the transmitter results in the location messages in the form that will be described shortly having an approximate duration of 15 milliseconds. If it is known that numerous TXs are going to be used within the range of the same RX, the transmission rate could be increased to reduce the message duration and so reduce collisions.

A power supply 318 provides power to the above-described components of the TX. In the prototype TXs, this power supply 318 includes a battery capable of providing 3.6 volts at 1 Ahr capacity. A regulator in the power supply 318 converts the battery voltage to 5 volts for the electronic components of the TX. The prototype TXs use about 3 mA when running normally, which increases to 9 mA during transmission of a location message and 0 mA when in the shutdown mode.

The aforementioned location message transmitted by each TX includes an identification number uniquely identifying the TX, as well as optional data such as a message count value, checksum, and accelerometer data. The identification number is programmed into a memory of the TX microcontroller and does not change. In the aforementioned prototype TXs, the identification number is a 16 bit value, although it could take any form desired. The optional message count number and checksum are used for error detection purposes. Essentially, the message count number is an 8-bit value that identifies the number of messages sent since the TX was last activated (or since the count value rolled over since the 8-bits only allow 256 different values). The TX increments the message count number each time a new location message is to be transmitted. Thus, the receiver will know if it receives an out of sequence message from a particular TX, thereby indicating an interim message was lost.

As for the optional accelerometer data, this can be used for motion studies and the like. Specifically, an accelerometer signal history in the form of a count of the number of times the accelerometer signal exceeded an accelerometer signal level threshold in a prescribed period of time (e.g., 1 second) is included in the location message. Preferably, a separate count is included for each consecutive prescribed period of time occurring since the last transmission of the location message.

Even if the accelerometer data is not transmitted, it is employed by the transmitter when operating in the previously mentioned battery saving mode. Essentially, the idea behind the battery saving mode is that if the person or object carrying the TX has not moved, then there is no reason to transmit a location message that will indicate the person or object is in the same place. Thus, the battery saving mode of operation involves determining if the TX has moved since the last transmission, and if not, curtailing further transmissions until the TX is moved once again. In this way the battery power expended during unnecessary transmissions is saved. Any appropriate method for determining whether the person or object has moved based on the accelerometer signal can be employed, such as the counting method described above.

Figure 4:
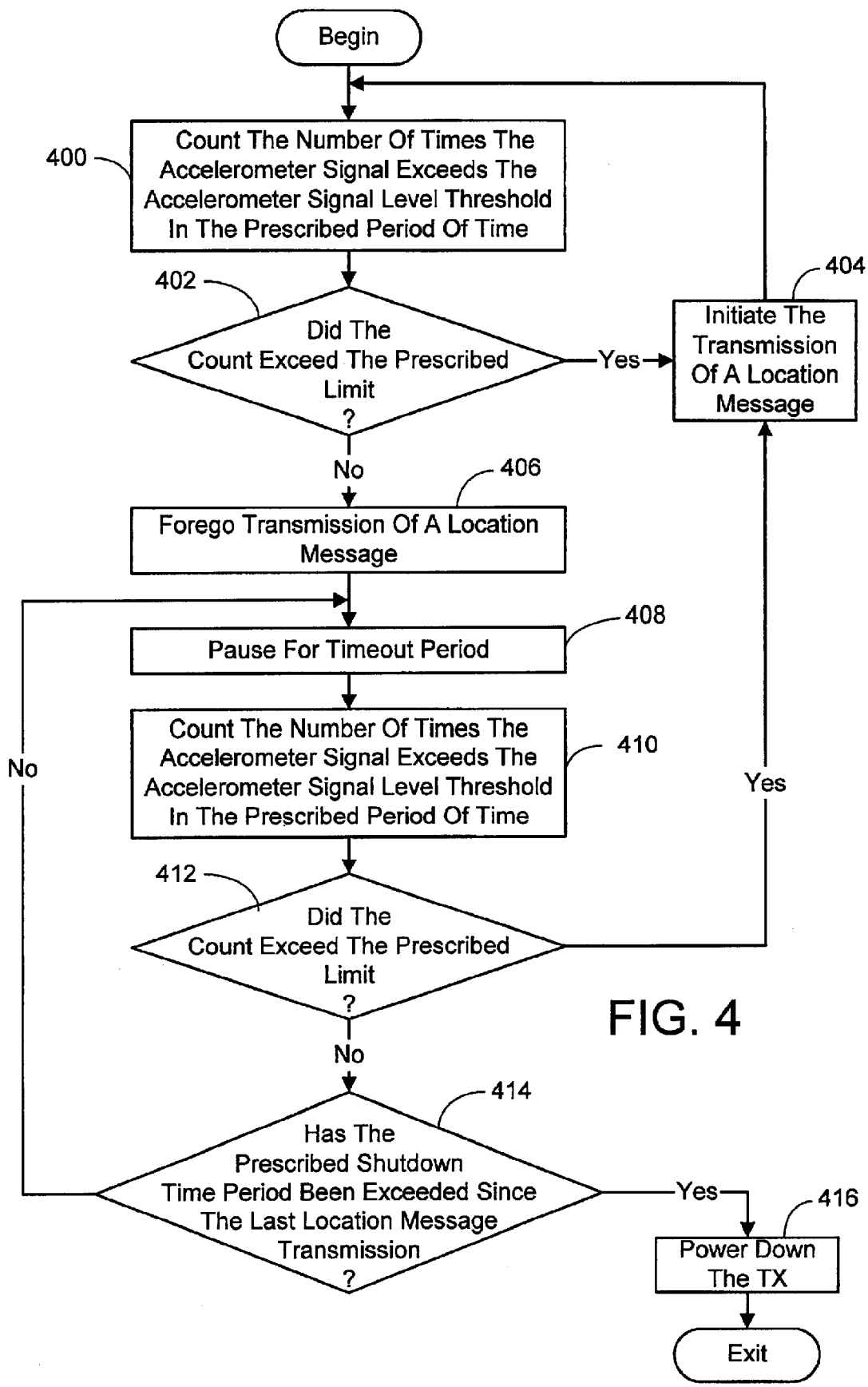
FIG. 4 is a flow chart diagramming a process for conserving the battery life of a RF transmitter employed in the location tracking system of FIG. 1.

Referring to FIG. 4, a process employed in the prototype TXs for implementing the battery saving mode of operation is outlined. Specifically, the process begins by the microcontroller keeping a count of the number of times the accelerometer signal exceeds an accelerometer signal level threshold in a prescribed period of time (process action 400). The prescribed period of time used in the prototype TXs was 1 second. It is then determined whether the count accumulated for a just-completed period exceeds a prescribed limit (process action 402). If the count exceeds the prescribed limit, then it is deemed that the TX is moving and a transmission of a location message is initiated (process action 404). The process then repeats starting with process action 400. If however, the prescribed count limit is not exceeded, then no transmission is made (process action 406). The count threshold is chosen based on the application and can be readily determined using empirical methods. For example, if it is desired to track the location of a person moving through a building, the count threshold would be chosen to be large enough to ensure the detected motion is likely attributable to the person walking as opposed to for instance simply shifting in a chair. In prototype TXs designed to track the location of persons and object through a building, the count threshold was set at two.

It is possible to extend the battery life of a TX even further by shutting off the device completely, rather than just foregoing a transmission. While it is not necessary to implement this second phase of the battery saving mode of operation, it was used in the prototype TXs. Referring once again to FIG. 4, the second phase is initiated whenever no transmission was made in process action 406 due to a lack of significant motion. Specifically, the microcontroller waits a timeout period (process action 408), and then in process action 410 samples the accelerometer signal for the aforementioned prescribed period of time (e.g., 1 second) by keeping track of the number of times the accelerometer signal exceeded the threshold level. In the prototype TXs, the timeout period was set to 2 seconds. It is then determined if the aforementioned count limit has been exceeded (process action 412). If it is exceeded, a transmission is initiated (process action 404) and the process is repeated starting with process action 400. However, if the count limit is not exceeded, the periodic sampling continues until a shutdown time limit is reached. Specifically, it is determined if a prescribed shutdown time period has been exceeded since the last transmission by the TX (process action 414). In the prototype TXs, the prescribed shutdown time period was 1 minute. If the shutdown period is not exceeded, process actions 408 through 412 are repeated as appropriate. If, however, the shutdown period is exceeded, then in process action 416, the TX is powered down.

For the most part, the TX remains off until one of two things occurs. The user can manually turn the TX on using its power off switch, or the unit can be moved violently enough to close the aforementioned tilt switch. In the latter case, physical movement of the TX causes the tilt switch to close and send an interrupt to the microcontroller to wake it up. However, one caveat to this TX shutdown mode is an optional "lost badge" feature. This feature involves programming the microcontroller of the TX to wake up from the shutdown mode periodically to transmit a location message. In this way, if a TX is misplaced and goes into shutdown mode due to a lack of movement, the locating tracking system will still be able to locate it using the periodic transmission of the location message. In prototypes of the TX this feature was implemented so that the TX woke up once every hour to transmit the location message.

As indicated above, a transmission of a location message represents a major drain on battery power, thus precluding transmission when the person or object is not moving conserves power and provides the opportunity for battery management. In the prototype TXs, using a lithium/thionyl chloride battery (such as a model SL350 battery manufactured by Sonnenschein Lithium Gmbh of Buedingen, Germany), it is estimated that the battery could last 12 months or more before requiring replacement. In regard to battery replacement, an option feature of the present location system is to include the battery voltage level as part of the location message transmitted by the TXs. If the voltage falls below a prescribed level, the system would deem that it needs replacement and the user would be notified. More importantly, if the TX stopped transmitting location messages for some prescribed period of time, the system could interpret this as due to battery failure and not a lack of motion.

In addition, when there are a multitude of TXs in an environment, the fewer times each one of them transmits, the lower the chance is that collisions will occur. This is important because the receipt of simultaneous transmissions by more than one TX cannot be distinguished by the RX and the data contained in the colliding transmissions would be lost. Thus, the battery saving mode of operation not only extends the battery life, but at the same time helps to prevent location signal congestion among TXs within range of the same receiver.

Another use for the accelerometer signal involves an optional secure user identification scheme. In this scheme, the TX is modified to include a Personal Identification Number (PIN) input apparatus. In a simple form, this apparatus could be a number key pad such as those used on cell phones and the like. The user enters a PIN into the TX via the keypad. This PIN is one known to the overall location system to be associated with that person (or object). Thus, the location of the TX is deemed to be the location of the person or object corresponding to the PIN. The PIN is transmitted in each location message transmitted from the TX, along with or in lieu of the aforementioned TX identification number.

Given the foregoing secure user identification scheme, a question arises on how to prevent a TX that is somehow separated (e.g., mislaid, stolen, etc.) from the person or object associated with the entered PIN from misleading the location system as to the whereabouts of the PIN user or holder. This is where the accelerometer signal comes into play. Essentially, if the accelerometer signal indicates that the TX has not moved for a prescribed period of time, then the TX erases the PIN and will not transmit until reinitialized with a PIN by an authorized user. Alternately, if the TX is designed to be carried by a person or object in a particular orientation, such as a button or card worn on the outside of one's shirt or jacket, then a dramatic change in orientation could signal that the TX has been separated from the PIN holder. The separate x-axis and y-axis accelerometer signals could be used to define the expected orientation and if these signals indicated a radically different orientation for some prescribed period of time, it would be assumed the TX has been removed from the person or object and the PIN would be erased and all further transmissions ceased until the PIN is reentered by a PIN holder.

Figure 5:
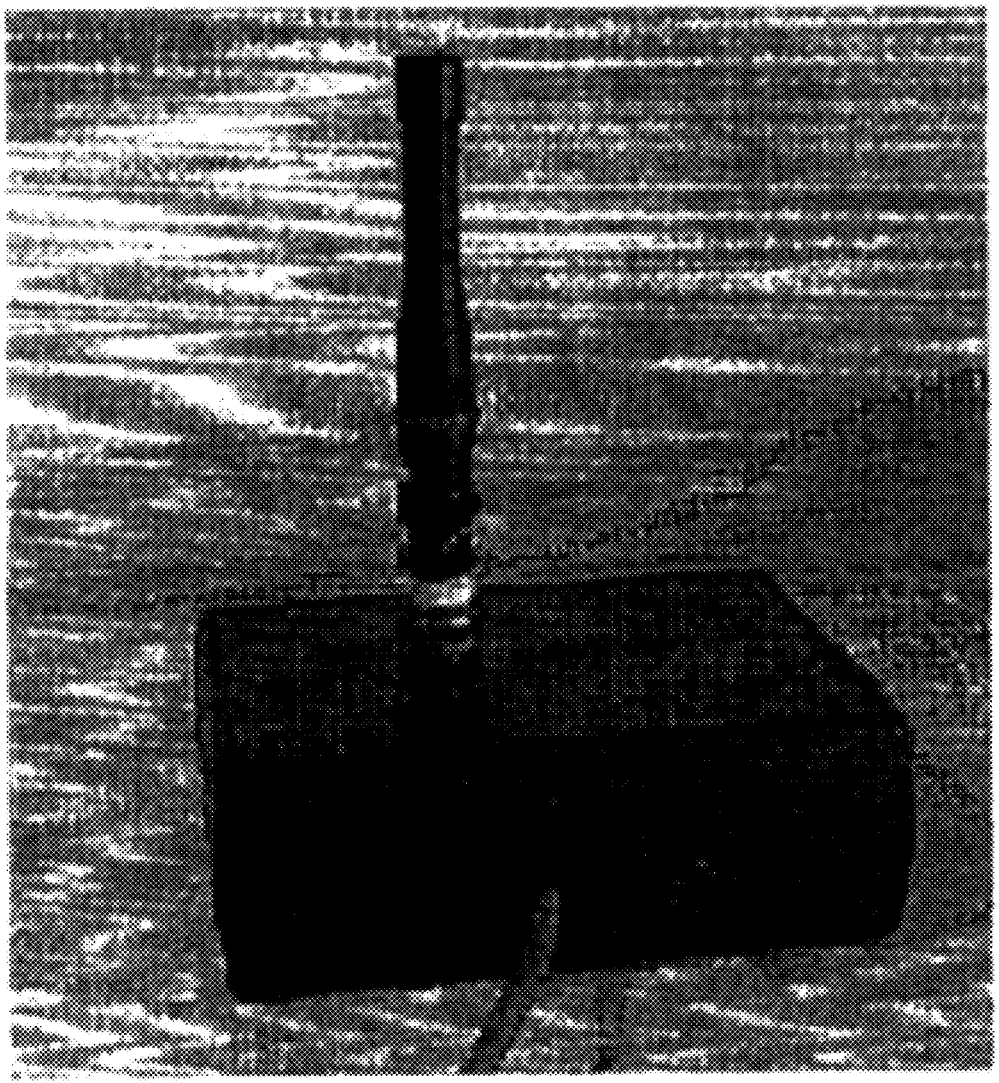
FIG. 5 is an image depicting the exterior of one version of the RF receiver employed in the location tracking system of FIG. 1.

The RF receiver (RX) used in the present location system and process will now be described. In one version, as shown in FIG. 5, the receiver unit (RX) is a small, stand-alone box with connections for DC power and communications with the PC, respectively, and an external antenna. In the prototype version, communication with the PC is done serially via a RS232 communication interface. However, other communication interfaces can also be employed as desired. For example, the PC communications could be accomplished using a Universal System Bus (USB), or IEEE 1394 (Firewire) interface, or even a wireless interface. The antenna in the prototype RX is a 15 cm antenna designed to receive 433 Mhz radio transmissions from the transmitter units (TXs) and has a range of approximately 50 feet. This range is more than enough since the TXs are preferable limited to a transmission range of 50 feet.

Figure 6:
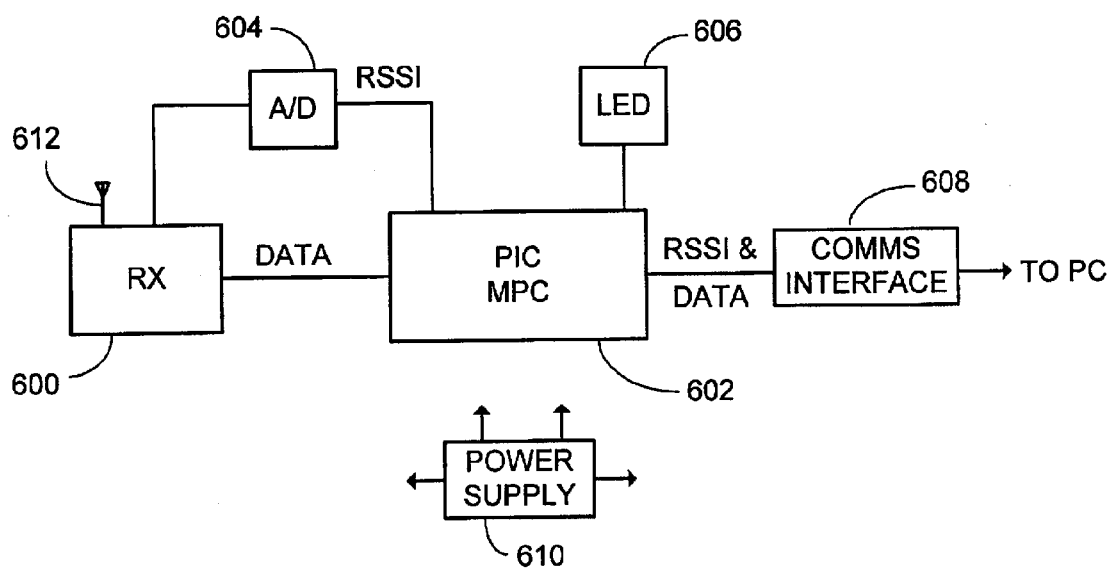
FIG. 6 is a block diagram illustrating the internal components included in the RF receiver employed in the location tracking system of FIG. 1.

Referring now to the block diagram of FIG. 6, the general construction of the RX will be described. The antenna 612 receives a message signal from a TX and the radio frequency receiver 600 demodulates it to produce a DATA signal for input into a PIC microcontroller 602 (e.g., a PIC 18F879 flush-mount Flash PIC microcontroller). The receiver 600 also generates a conventional radio signal strength indicator (RSSI) signal which is fed into the microcontroller 602 via an analog to digital converter 604. The converter 604 may be integrated into the microcontroller 602 as it was in the prototype RX. An optional LED 606 is connected to the microcontroller 602 and indicates the power on/signal received status of the RX. This LED 606 extends through the case of the RX so as to be visible from the outside. The microcontroller 602 provides a separate output representing a combined RSSI and DATA signal for each received location message signal, as will be described shortly. In the prototype, the combined signal is output at 9600 Baud.

A communication interface 608 converts microcontroller voltage levels to levels readable by a PC. As indicated previously, the communication interface in the prototype RX converts the microcontroller voltage levels to RS232 level voltages. Power for the RX components is provided by power supply 610, which in the prototype is a separate mains powered AC circuit providing 7 to 30V DC.

Each RX is connected to a PC, as described previously. Typically, whenever a location message is received from a TX and processed as described above, the RX outputs location information to the PC. Specifically, this information includes the identification number of the TX, the error detection data (i.e., the message count value and checksum), and accelerometer data (if transmitted by the TX). This information comes from the location message received from the TX and collectively represents the aforementioned DATA signal. In addition to the foregoing items, the information output by the RX also includes the RSSI data associated with the received location message and a unique receiver identifier. Thus, the DATA and RSSI information represents a part of the aforementioned combined signal. The foregoing information message sent by the RX to the PC presumes that the PC handles errors detected in the received TX location message. However, alternately, the RX could forego sending information derived from location messages that are known to have an error. The centralized computing device is preprogrammed to know the person or object associated with each TX and the physical location of each RX, thereby allowing the centralized computer to determine the location of each person or object carrying a TX using the RSSI, transmitter identifier and receiver identifier provided in a data message.

It is noted that will the above-described version of the RX is a stand-alone unit, this need not be the case. The RX could be readily integrated into the PC itself. For example, the RX could be configured as an expansion card which is installed in an expansion slot of the PC. In such a case only the antenna need be external to the PC.

One final use of the accelerometer data involves assessing the accuracy of the RSSI. In those versions of the present location system and process in which the accelerometer data is transmitted by the TXs, the data can be used to grade the accuracy of the RSSI measured by the RX since RSSI measurements will be more accurate when the person or object is not moving. Thus, if the accelerometer data indicates the TX is not moving, then it can be assumed the RSSI measurement is accurate, or at least more accurate than if the TX was moving.

Wherefore, what is claimed is:

1. A location tracking system for determining the location of persons and objects using transmitters that transmit location messages to at least one receiver connected to a computing device in a network of computing devices, comprising:
   a plurality of battery-powered, radio frequency (RF), transmission-capable only transmitters (TXs), each of which is carried by the person, or attached to the object, whose location is to be determined;
   at least one RF receiver (RX), each of which receives location messages transmitted by TXs within signal range of the RX;
   at least one computing device, each of which is in communication with a different one of the RX and receives data messages from the RX each of which is generated using a location message received from a TX;
   a centralized computing device which is in communication with each of the computing devices associated with a RX via said network, wherein said centralized computing device determines the location each of person carrying a TX or object having an attached TX, using data derived from data messages forwarded to it from a computing device associated with a RX.

2. The system of claim 1, wherein the location messages transmitted by each TX comprise a transmitter identifier which uniquely identifies the particular TX transmitting the location message.

3. The system of claim 2, wherein each RX measures the strength of the signal carrying a location message received from a TX to produce a radio signal strength indicator (RSSI), and wherein the data message sent to the computing device associated with each receiver and forwarded to the centralized computing device comprises the transmitter identifier contained in the location message received from the TX, the RSSI associated with the location message and a receiver identifier that uniquely identifies the particular RX sending the data message.

4. The system of claim 3, wherein the centralized computing device is preprogrammed to know the person or object associated with each TX and the physical location of each RX, thereby allowing the centralized computer to determine the location of each person carrying a TX or object having an attached TX using the RSSI, transmitter identifier and receiver identifier provided in a data message generated by a RX in response to the receipt of a location message from that TX.

5. The system of claim 1, wherein the location messages transmitted by each TX comprise error detection data.

6. The system of claim 5, wherein the error detection data comprises a message count which is incremented each time a TX transmits a location message.

7. The system of claim 5, wherein the error detection data comprises a checksum value.

8. The system of claim 7, wherein the error detection data further comprises a message count which is incremented each time a TX transmits a location message, and wherein the RX determines whether a location message received from a TX has a message count one increment above the last previously received location message transmitted from that TX, and whenever it is not foregoes providing a data message corresponding to the out-of-sequence location message to the computing device associated with the RX.

9. The system of claim 7, wherein the RX determines whether a location message received from a TX in incomplete based on the location message's checksum message, and whenever it is determined that the location is incomplete forego providing a data message corresponding to the incomplete location message to the computing device associated with the RX.

10. The system of claim 7, wherein the error detection data further comprises a message count which is incremented each time a TX transmits a location message, and wherein the message count is included in the data message generated by a RX that received the location message, and wherein the centralized computing device receiving the data message generated by the RX that received the location message determines whether the message count is one increment above the last previously transmitted location message from that TX.

11. The system of claim 7, wherein the checksum is included in the data message generated by a RX that received the location message, and wherein the centralized computing device receiving the data message generated by the RX that received the location message determines whether the location message was complete using the checksum.

12. The system of claim 1, wherein each TX comprises:
   a microcontroller;
   an accelerometer which is connected to the microcontroller and provides a signal to the microcontroller indicative of the severity of motion to which the TX is being subjected;
   one or more manually-operated function selection switches which are connected to the microcontroller and which activate and deactivate particular functions of the TX;
   a RF transmitter unit which is connected to the microcontroller and which transmits the location message whenever supplied to it by the microcontroller; and
   a power supply for powering the electronic components of the TX.

13. The system of claim 12, wherein the TX microcontroller includes data representing the accelerometer signal history in the location message.

14. The system of claim 13, wherein the accelerometer signal history is in the form of a count of the number of times the accelerometer signal exceeded an accelerometer signal level threshold in a prescribed period of time.

15. The system of claim 14, wherein a separate count is included in the location message for each consecutive prescribed period of time occurring since the last previous transmission of the location message.

16. The system of claim 12, wherein the one or more manually-operated function selection switches of the TX comprises a continuous transmission mode switch which is normally in the open, deactivated position, and which when activated by manually closing the switch causes the location message to be transmitted at prescribed intervals.

17. The system of claim 16, wherein said prescribed interval is approximately every 1 second.

18. The system of claim 16, wherein the TX microcontroller monitors the accelerometer signal to determine if the TX is moving through an environment, and precludes the transmission of the location message when the TX is not moving, so as to conserve power and minimize collisions at a receiver with location messages transmitted by other TXs in the environment, unless the continuous transmission mode switch is activated.

19. The system of claim 16, wherein the TX microcontroller monitors the accelerometer signal to determine if the TX is moving through an environment, and powers down the TX location message if the TX has not moved through said environment since said last previous transmission, thereby conserving power and minimizing collisions at a receiver with location messages transmitted by other TXs in the environment.

20. The system of claim 19, wherein the one or more manually-operated function selection switches of the TX comprise:
   a power-on switch which when activated by manually closing the switch causes the TX to be powered up; and
   a power-off switch which when activated by manually closing the switch causes the TX to be powered down.

21. The system of claim 20, wherein the one or more manually-operated function selection switches of the TX further comprise a motion-activated tilt switch which is connected to the microcontroller and which is normally open during times when the TX is substantially at rest, but closes at least momentarily when the TX is moved, and wherein whenever the TX has been powered down for lack of motion and subsequently moved the tilt switch closes and causes an interrupt signal to be sent to the microcontroller which in turn causes the microcontroller to power up the TX, if the power-on switch is activated.

22. The system of claim 20, wherein the one or more manually-operated function selection switches comprise a send-once switch which is normally in the open, disengaged position, and which when activated by manually closing the switch causes the microcontroller to transmit the location message regardless of when the location message would have been transmitted had the send-once switch not been activated, if the power-on switch is activated.

23. The system of claim 12, wherein the RF transmitter unit of the TX comprises:
   an antenna extending therefrom; and
   a 433 MHz FM 14400 KBaud low power transmitter having a maximum range of approximately 50 feet.

24. The system of claim 12, wherein the power supply of the TX comprises a battery.

25. The system of claim 24, wherein the location messages transmitted by the TX comprise a battery voltage level which is used to determine if the battery is failing and need of replacement.

26. The system of claim 12, wherein each TX further comprises a personal identification number (PIN) input apparatus with which a user enters a PIN into the TX which is stored by the TX microcontroller.

27. The system of claim 26, wherein the TX microcontroller includes the PIN in the location message, and wherein the PIN is used by the location tracking system to identify the person carrying the TX or the object to which the TX is attached.

28. The system of claim 26, wherein the TX microcontroller monitors the accelerometer signal to determine if the TX is moving through an environment, and whenever it is determined by the microcontroller that the TX has not moving through the environment during a prescribed period of time, the PIN stored by the microprocessor is erased and no location message is transmitted until replacement PIN number is entered into the TX.

29. The system of claim 26, wherein the accelerometer signal comprises separate x-axis and y-axis signals, and wherein the TX microcontroller monitors the accelerometer signal to determine if the TX has been placed in an orientation other than an expected orientation, and whenever it is determined by the TX microcontroller that the TX has been place in an unexpected orientation for a prescribed period of time, the PIN stored by the TX microprocessor is erased and no location message is transmitted until replacement PIN number is entered into the TX.

30. The system of claim 12, wherein the TX microcontroller monitors the accelerometer signal to determine if the TX is moving through an environment, and curtails the transmission of location messages by the TX during periods wherein the accelerometer signal indicates that the severity of motion is below a motion threshold that is attributable to movement of the person or object associated with the TX about an environment.

31. The system of claim 30, wherein curtailing the transmission of location messages by the TX, comprises the TX microcontroller:
   counting the number of times the accelerometer signal exceeds an accelerometer signal level threshold in a prescribed period of time;
   whenever the count does not exceed a prescribed number, deeming that the accelerometer signal indicates the severity of motion is below the motion threshold and foregoing transmission of the location message; and
   whenever the count does exceed the prescribed number, deeming that the accelerometer signal indicates the severity of motion exceeds the motion threshold and initiating a transmission of the location message.

32. The system of claim 31, wherein the prescribed period of time is approximately 1 second.

33. The system of claim 31, wherein the prescribed number is two.

34. The system of claim 31, wherein curtailing the transmission of location messages by the TX further comprises, whenever the transmission of the location message is not made because the accelerometer signal indicates the severity of motion is below the motion threshold, the TX microcontroller:
   (a) waiting a prescribed timeout period;
   (b) counting the number of times the accelerometer signal exceeds the accelerometer signal level threshold in the prescribed period of time;
   (c) determining if the count exceeds the prescribed number;
   (d) whenever the count does not exceed the prescribed number, determining whether a prescribed shutdown time limit has been exceeded since the last transmission of a location message by the TX;
   (e) whenever it is determined that the shutdown time limit has not been exceeded, repeating (a) through (d);
   (f) whenever it is determined that the shutdown time limit has been exceeded, powering down the TX; and
   (g) whenever the count exceeds the prescribed number, initiating a transmission of the location message.

35. The system of claim 34, wherein the prescribed timeout period is approximately 2 second.

36. The system of claim 34, wherein the shutdown time limit is approximately 1 minute.

37. The system of claim 34, wherein each TX further comprises a motion-activated tilt switch that is open when the TX is substantially at rest, and which whenever the TX is powered down because it was determined that the shutdown time limit had been exceeded, powers on the TX if activated due to motion of the TX.

38. The system of claim 34, wherein the TX microcontroller periodically powers up a TX which was powered down because it was determined that a shutdown time limit had been exceeded, and transmits a location message.

39. The system of claim 38, wherein TX microcontroller periodically powers up a TX, which was powered down because it was determined that a shutdown time limit had been exceeded, once every hour.

* * * * *